US011277223B2

(12) United States Patent
Hussain et al.

(10) Patent No.: US 11,277,223 B2
(45) Date of Patent: Mar. 15, 2022

(54) CONTROL CHANNEL DESIGN FOR CATEGORY-A DEVICES

(71) Applicant: Apple Inc., Cupertino, CA (US)

(72) Inventors: Awais M. Hussain, Milpitas, CA (US); Tarik Tabet, Los Gatos, CA (US); Lydi Smaini, San Jose, CA (US); Moustafa M. Elsayed, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 688 days.

(21) Appl. No.: 15/598,470

(22) Filed: May 18, 2017

(65) Prior Publication Data

US 2017/0339681 A1 Nov. 23, 2017

Related U.S. Application Data

(60) Provisional application No. 62/339,726, filed on May 20, 2016.

(51) Int. Cl.
*H04L 1/00* (2006.01)
*H04L 5/00* (2006.01)

(52) U.S. Cl.
CPC .......... *H04L 1/0038* (2013.01); *H04L 1/0045* (2013.01); *H04L 5/0053* (2013.01); *H04L 5/0092* (2013.01)

(58) Field of Classification Search
CPC .. H04W 72/042; H04B 7/0452; H04L 1/0038; H04L 5/0053; H04L 5/0092
See application file for complete search history.

(56) References Cited

U.S. PATENT DOCUMENTS

| 9,246,618 | B2* | 1/2016 | Jain | H04W 4/90 |
| 9,924,498 | B2* | 3/2018 | Chen | H04W 72/0406 |
| 2010/0057485 | A1* | 3/2010 | Luft | H04W 4/70 455/411 |
| 2014/0112243 | A1* | 4/2014 | Suzuki | H04W 56/00 370/328 |

(Continued)

FOREIGN PATENT DOCUMENTS

WO WO 2016/182050 11/2016

*Primary Examiner* — Jeffrey M Rutkowski
*Assistant Examiner* — Jasper Kwoh
(74) *Attorney, Agent, or Firm* — Kowert, Hood, Munyon, Rankin & Goetzel, P.C.

(57) ABSTRACT

A user equipment device (UE) may communicate according to a new device category satisfying specified QoS (quality of service) requirements while also satisfying specified link budget requirements, and additional optimization requirements. The UE may use physical channels and procedures (e.g. it may receive and decode control channels) in a manner compatible with and not infringing on the operation of other UEs operating in the same network, while allowing the network more flexibility to assign resources. Specifically, resources for EPDCCH on UE-specific SS and EPDCCH on common SS may be shared. That is, the resources for two search spaces may be overlaid partially or in full, giving the network more flexibility in allocating resources. Furthermore the DCI formats for MPDCCH may be extended to devices operating according to the new device category, which enables the coverage enhancement of MTC for these devices.

20 Claims, 12 Drawing Sheets

(56) References Cited

U.S. PATENT DOCUMENTS

| | | |
|---|---|---|
| 2016/0105264 A1 | 4/2016 | Chen et al. |
| 2016/0127097 A1* | 5/2016 | Chen .................... H04L 5/0051 370/330 |
| 2016/0270116 A1* | 9/2016 | Lin ................... H04W 72/1289 |
| 2016/0309282 A1 | 10/2016 | Xu et al. |
| 2018/0234953 A1* | 8/2018 | Beale ................. H04W 72/042 |

* cited by examiner

PRB pair used for EPDCCH on UE-specific search space for distributed transmission

Port 109

Port 107

PRB pair used for EPDCCH on common search space for distributed transmission

Port 109

Port 107

PRB pair used for EPDCCH for localized transmission

| 0 | 12 | 8 | 4 | 0 | 107 | 107 | 8 | 4 | 0 | 12 | 8 | 107 | 107 |
|---|---|---|---|---|---|---|---|---|---|---|---|---|---|
| 1 | 13 | 9 | 5 | 1 | 109 | 109 | 9 | 5 | 1 | 13 | 9 | 109 | 109 |
| 2 | 14 | 10 | 6 | 2 | 12 | 2 | 10 | 6 | 2 | 14 | 10 | 4 | 10 |
| 3 | 15 | 11 | 7 | 3 | 13 | 3 | 11 | 7 | 3 | 15 | 11 | 5 | 11 |
| 4 | 0 | 12 | 8 | 4 | 14 | 4 | 12 | 8 | 4 | 0 | 12 | 6 | 12 |
| 5 | 1 | 13 | 9 | 5 | 107 | 107 | 13 | 9 | 5 | 1 | 13 | 107 | 107 |
| 6 | 2 | 14 | 10 | 6 | 109 | 109 | 14 | 10 | 6 | 2 | 14 | 109 | 109 |
| 7 | 3 | 15 | 11 | 7 | 15 | 5 | 15 | 11 | 7 | 3 | 15 | 7 | 13 |
| 8 | 4 | 0 | 12 | 8 | 0 | 6 | 0 | 12 | 8 | 4 | 0 | 8 | 14 |
| 9 | 5 | 1 | 13 | 9 | 1 | 7 | 1 | 13 | 9 | 5 | 1 | 9 | 15 |
| 10 | 6 | 2 | 14 | 10 | 107 | 107 | 2 | 14 | 10 | 6 | 2 | 107 | 107 |
| 11 | 7 | 3 | 15 | 11 | 109 | 109 | 3 | 15 | 11 | 7 | 3 | 109 | 109 |

← Symbols →

Subcarriers ↕

Port 109     Port 107

CONTROL CHANNEL DESIGN FOR CATEGORY-A DEVICES

PRIORITY CLAIM

This application claims benefit of priority of U.S. Provisional Patent Application Ser. No. 62/339,726 titled "Control Channel Design for Category A Devices", filed on May 20, 2016, which is hereby incorporated by reference as though fully and completely set forth herein.

FIELD OF THE INVENTION

The present application relates to wireless communications, and more particularly to control channel design for a new category of devices in 3GPP wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

Various ones of the wireless communications standards, such as LTE, utilize packet switched networks. The LTE specification defines a number of User Equipment (UE) categories, where each LTE category defines the overall performance and the capabilities of a UE. These LIE categories define the standards to which a particular handset, dongle or other equipment will operate in the communication system. The LIE categories or UE classes are used to ensure that the base station (eNodeB or eNB) can communicate correctly with the user equipment. The UE relays the LIE LE category information to the base station, and thus the base station is able to determine the performance characteristics of the UE and communicate with the UE accordingly. This enables the eNB to communicate using capabilities that it knows the UE possesses. While users may not be particularly aware of the category of their LE, the performance of the LE matches the UE's category and allows the eNB to communicate effectively with all the UEs that are connected to it. The LIE UP category information therefore may be important to the performance of the UE.

The eNB may be less likely to communicate beyond the performance of the UE corresponding to the category of the UR Thus it may be desirable to introduce one or more new UE categories to provide for flexibility in operation. U.S. Patent Application No. 62/274,353 titled "New Device Category in 3GPP Communications" describes one possible category. It may also be desirable to provide an improved design for usage of control channels for the operation of wireless communication device devices belonging to any particular device category, especially a new device category, e.g. the category disclosed in the above referenced U.S. patent application. Accordingly, improvements in the field are desirable.

Other corresponding issues related to the prior art will become apparent to one skilled in the art after comparing such prior art with the disclosed embodiments as described herein.

SUMMARY OF THE INVENTION

Embodiments are presented herein of, inter alia, methods for wireless communication devices communicating, e.g. with cellular base stations, according to a new device category, and of devices that implement the methods. Embodiments are further presented herein for wireless communication systems containing user equipment (UE) devices and base stations communicating with each other within the wireless communication systems.

In various embodiments, a UE may communicate according to a new device category satisfying specified QoS (Quality of Service) requirements while also satisfying specified link budget requirements, and, in some embodiments, additional optimization requirements. The UE may communicate with a cellular base station according to the new device category, and may switch to communicating with the cellular base station in a way that the UE uses physical channels and/or procedures that are specific to one or more other, different device categories. For example, the UE may switch to using physical channels and/or procedures associated with a second (pre-existing) device category if the link budget requirements exceed a specified value and the QoS requirements are not sensitive, while communicating with the cellular base station. The UE may also switch to using physical channels and/or procedures associated with a third (pre-existing) device type if either the link budget requirement does not exceed the specified value, or the QoS requirements are sensitive and a downlink throughput requirement exceeds a specified throughput value, while communicating with the cellular base station.

Furthermore, a UE communicating according to the new device category may use physical channels and procedures (e.g. may receive and decode control channels) in a manner compatible with and not infringing on the operation of other UEs operating in the same network while allowing the network more flexibility to assign resources. Specifically, resources for EPDCCH (Enhanced Physical Downlink Control Channel) on UE-specific SS (Search Space) and EPDCCH on common SS may be optionally shared. That is, the resources for two search spaces may be overlaid partially or in full, giving the network more flexibility in allocating resources. Furthermore the DCI (Downlink Control Information) formats for MPDCCH (Machine Type Communications Physical Downlink Control Channel) may be extended to Cat-A devices, which enables the coverage enhancement of MTC (Machine Type Communications) for Cat-A devices. Specifically, at least some resources may be shared between the MPDCCH and the EPDCCH on common SS for distributed transmissions, and/or some of the resources may be shared between the EPDCCH on common SS and EPDCCH on UE-specific SS, with resource elements transmitted on different ports in both cases in order to allow resource sharing by multi-user MIMO methods. This allows the network to manage the resource sharing in a manner that is transparent to the UEs, although the UEs may advantageously use multi-user MIMO methods in order to aid reception.

Pursuant to the above, a UE may perform wireless communications with a cellular base station as device that identified to the cellular base station as belonging to a first device category. According to various embodiments disclosed herein, the first device category may be a newly designated and defined device category, herein name as Category A, or Cat-A. The UE may thereby operate according to a plurality of communication parameters that specify how the UE communicates with the cellular base station, and the UE may decode Downlink Control Information (DCI) on any physical channel from among: physical downlink control channel (PDCCH), enhanced PDCCH (EPDCCH) and/ or Machine Type Communications PDCCH (MPDCCH). When decoding the DCI on the MPDCCH, the UE may recognize which DCI of multiple DCIs on the MPDCCH to decode based at least on the length of the DCI.

In various embodiments, the length of the DCI (on the MPDCCH) decoded by the UE is different from the length of other DCIs (on the MPDCCH) that are decoded by other devices that belong to a different device category than the UE. That is, the difference between the length of the DCI decoded by the UE on the MPDCCH and the length of the DCI decoded on the MPDCCH by the other devices allows respective receivers in the UE and the other devices to recognize which DCI to decode.

For distributed transmissions, at least some resources may be shared between the MPDCCH and the EPDCCH on common search space, and/or between the EPDCCH on common search space and the EPDCCH on UE-specific search space. At least some of the resources may be shared by overlaying one or more but not all physical resource block pairs. The resource elements may be transmitted on multiple respective ports, and the UE may access the shared resources through multi-user multiple-input-multiple-output (MIMO) methods. The sharing of the resources may be managed by the cellular base station and may remain transparent to the UE.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
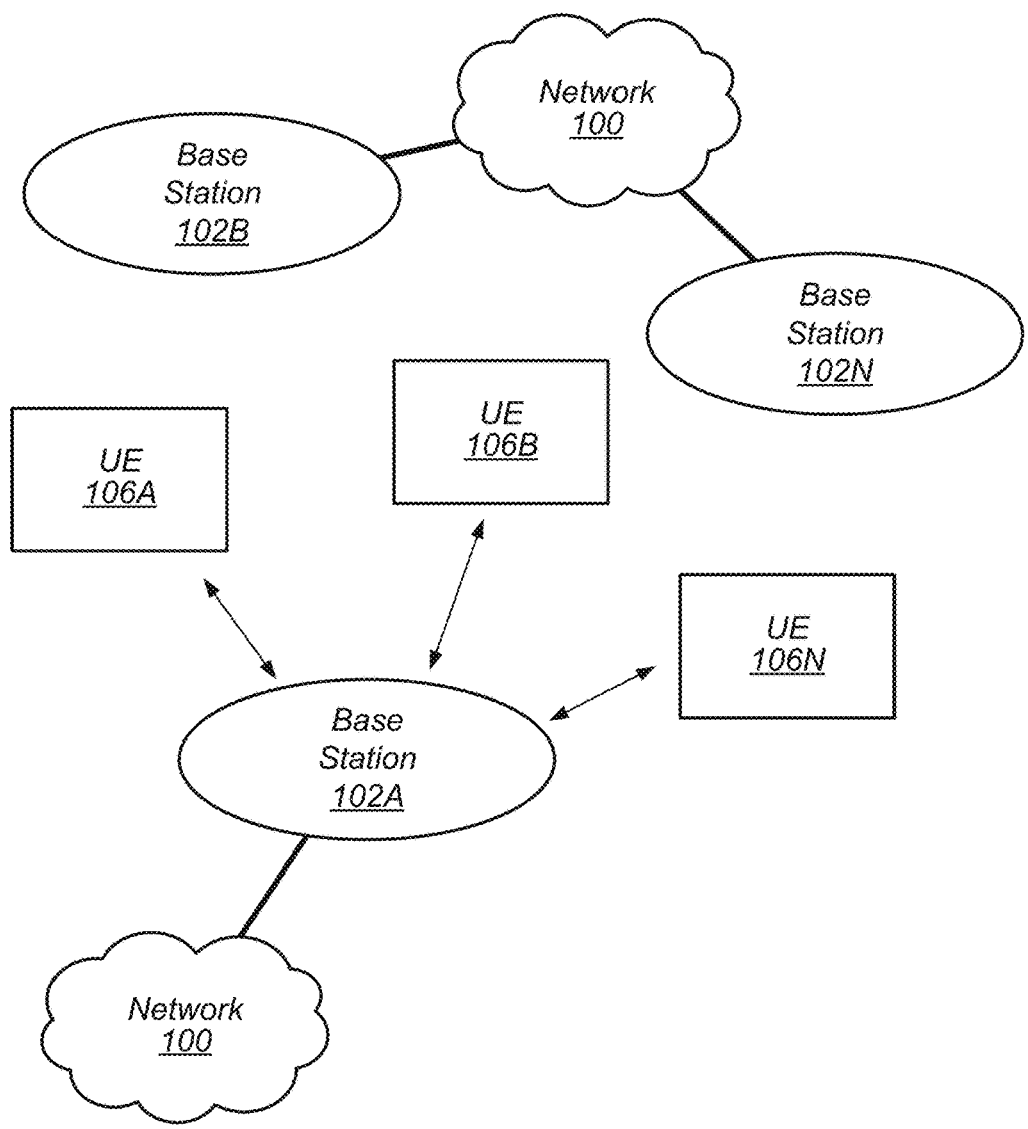
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AP: Access Point
APR: Applications Processor
BS: Base Station
BSR: Buffer Size Report
BW: Bandwidth
CCE: Control Channel Element
CDM: Code Division Multiplexing
CMR: Change Mode Request
DL: Downlink (from BS to UE)
DMRS: Demodulation Reference Signal
ECCE: Enhanced Control Channel Element
EPDCCH: Enhanced Physical Downlink Control Channel
EREG: Enhanced Resource Element Group
FDD: Frequency Division Duplexing
FEC: Forward Error Correction Coding
GPRS: General Packet Radio Service
GSM: Global System for Mobile Communication
LAN: Local Area Network
LTE: Long Term Evolution MPDCCH: MTC Physical Downlink Control Channel
OFDM: Orthogonal Frequency Division Multiplexing
PDCCH: Physical Downlink Control Channel
PDCP: Packet Data Convergence Protocol
PDN: Packet Data Network
PDSCH: Physical Downlink Shared Channel
PDU: Protocol Data Unit
PRB: Physical Resource Block
PUCCH: Physical Uplink Control Channel
QCI: Quality of Service Class Identifier
QoS: Quality of Service
RAR: Random Access Response
RAT: Radio Access Technology
RB: Resource Block
RE: Resource Element
RF: Radio Frequency
RNTI: Radio Network Temporary Identifier
RRC: Radio Resource Control
RTP: Real-time Transport Protocol
RX: Reception/Receive
SIB: System Information Block
SID: System Identification Number
SS: Search Space
TBS: Transport Block Size
TDD: Time Division Duplexing
TX: Transmission/Transmit
UE: User Equipment
UL: Uplink (from UE to BS)
UMTS: Universal Mobile Telecommunication System
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Also referred to as wireless communication devices. Examples of UEs include mobile telephones or smart phones (e.g., iPhone™, Android™-based phones) and tablet computers such as iPad™, Samsung Galaxy™, etc., portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
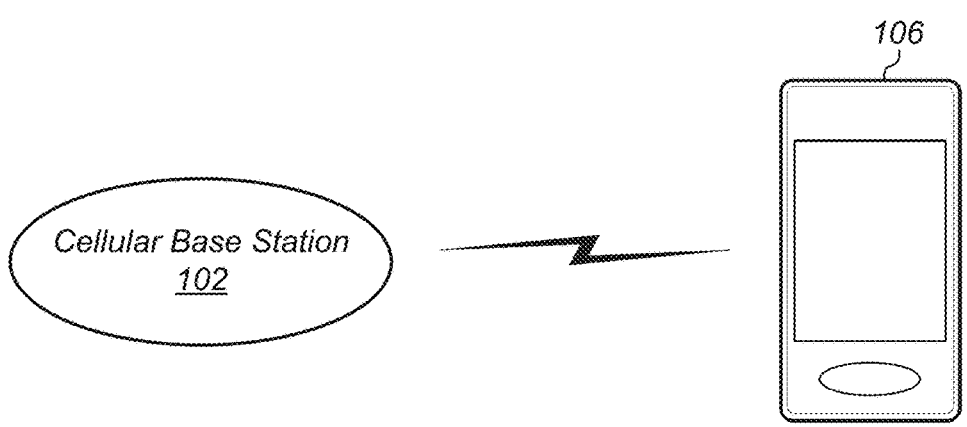
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown in FIG. 1, the exemplary wireless communication system includes a base station 102 which communicates over a transmission medium with one or more user devices 106-1 through 106-N. Each of the user devices may be referred to herein as a "user equipment" (UE) or UE. Thus, the user devices 106 are referred to as UEs or UE devices. Various ones of the UEs may operate according to a new category [definition] as detailed herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network. It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120-degree beam-width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads).

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 at least according to a new and improved category designation/definition of UE 106 as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
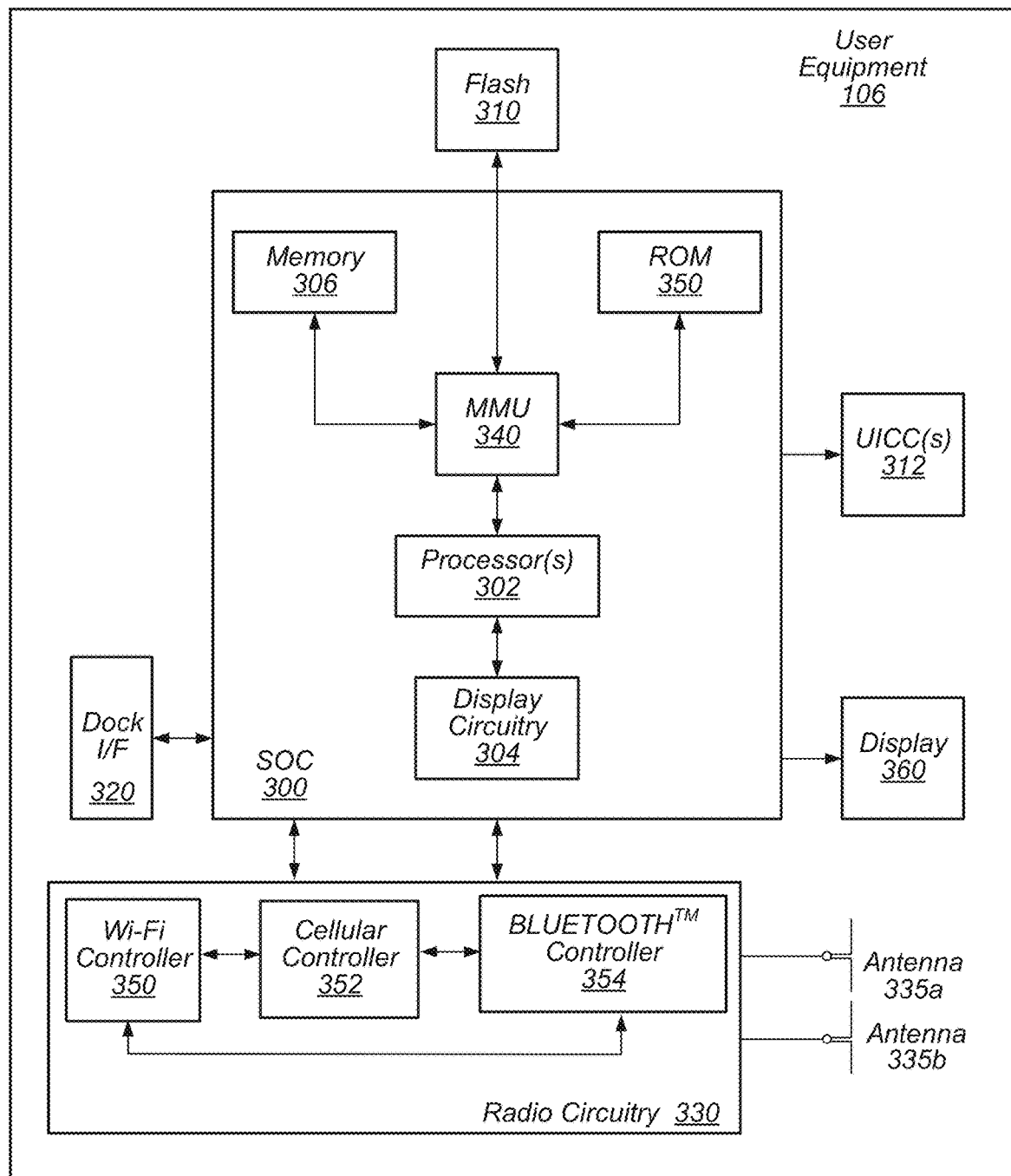
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330 circuitry, connector I/F 320, and/or display 360. The MMU 340 may be configured to perform memory protection and page table translation or set up. In some embodiments, the MMU 340 may be included as a portion of the processor(s) 302.

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As described further subsequently herein, the UE 106 (and/or base station 102) may include hardware and software components for implementing methods for UE 106 [and base station 102] communicating [with each other] at least according to a new and improved category designation of UE 106, including decoding physical control channels as will be further described herein. The processor(s) 302 of the UE 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporates communications corresponding to a new, improved category designation of UE 106, such communications including the decoding of physical control channels according to various embodiments disclosed herein. Processor(s) 302 may also implement various other applications and/or end-user applications running on UE 106.

In some embodiments, radio circuitry 330 may include separate controllers dedicated to controlling communications for various respective RAT standards. For example, as shown in FIG. 3, radio circuitry 330 may include a Wi-Fi controller 350, a cellular controller 352 (e.g. LTE controller), and BLUETOOTH™ controller 354, and in at least some embodiments, one or more or all of these controllers may be implemented as respective integrated circuits (ICs or chips, for short) in communication with each other and with SOC 300 (and more specifically with processor(s) 302) as will be further described below. For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE 106.

Figure 4:
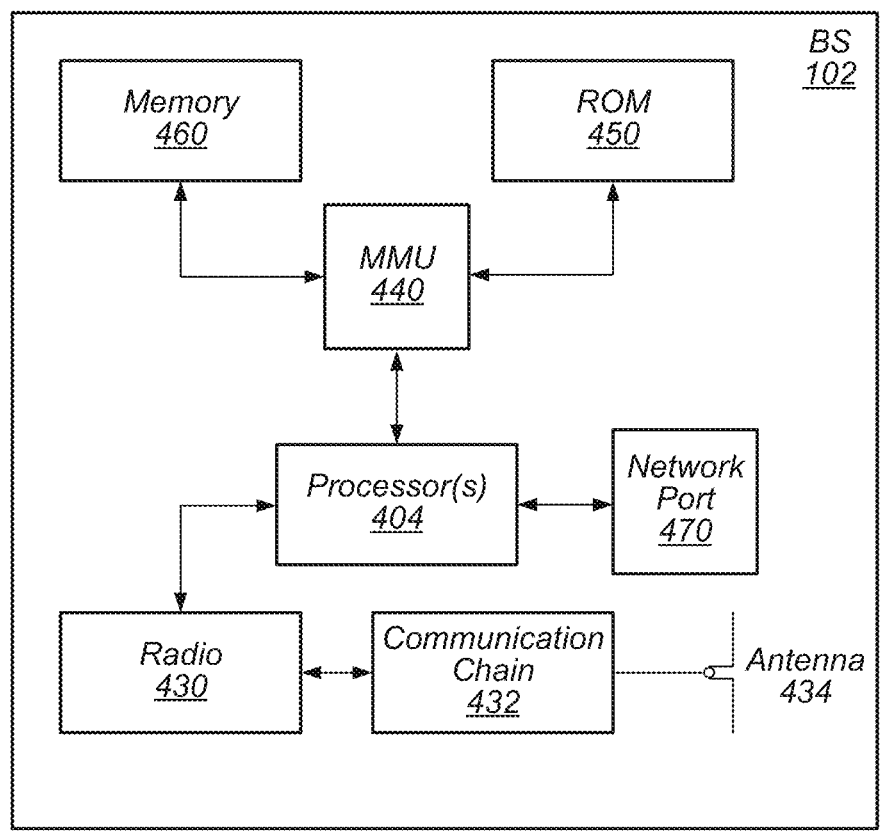
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UEs 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UEs 106. In some cases, the network port 470 may couple to a telephone network via the core network, and/or the core network may provide a telephone network (e.g., among other UEs serviced by the cellular service provider).

The base station 102 may include at least one antenna 434, and possibly multiple antennas. The at least one antenna 434 may be configured to operate as a wireless transceiver and may be further configured to communicate with UEs 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor(s) 404 of the base station 102 may be configured to implement part or all of the methods described herein for base station 102 to communicate with a UE belonging to a new category of devices capable of adaptively improving power consumption, link budget management, and performance during wireless communications, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices of a wider range of device categories.

Device Categories

There are many different device category definitions for LTE devices. For example, categories 1-8 are designated for smartphones, and most phones operate according to one of categories 3 to 8. In other words, smartphones typically operate as a device belonging to one of categories 3-8. Category M (Cat-M) is typically used for MTC (Machine Type Communications) devices such as soda machines, smart meters, etc. In some embodiments, a new category A (Cat-A) may be devised and tailored to a specific group of devices, for example to wearable devices such as smart watches or smart glasses or the like. In terms of functionality, wearable devices represent a compromise between link budget and quality of service (QoS). Thus, when considering current existing categories, it may be advantageous to retain the link budget improvement associated with Cat-M because of the form factor, while also retaining the QoS of smart phone categories for higher quality and more reliable wireless communications. Typically, if a Cat-M device has to report its electricity usage to the network, there is no need for the device to transmit such a report during peak wireless network traffic hours such as between 9 AM and noon. Instead, the device may transmit the report during off-peak hours, e.g. 3 AM when there is little or no network traffic. It may be considered difficult for the network to access the device in the middle of the day. Moreover, Cat-M does not necessarily support real-time applications. It would therefore be desirable to devise a new category satisfying QoS requirements along with an improved link budget (i.e. also satisfying certain link budget requirements), and potentially implementing additional desired optimizations. U.S. Patent Application No. 62/274,353 titled "New Device Category in 3GPP Communications" describes one such possible category designated as Category A, or Cat-A.

Cat-A DL Mode of Operation

Considering the new category (Cat-A), if the benefit of narrowband mode of operation is not sufficient or not needed, then in DL (downlink) mode the UE may operate according to a legacy Cat-1 mode of operation while remaining identified as a Cat-A device. In other words, if there is no need for a narrowband mode of operation in DL, then a Cat-A device may simply operate according to certain features, e.g. certain channels and/or mode of operation associated with a different device category, e.g. operate according to certain features and procedures associated with a legacy Cat-1 device during DL communications/operations. For link budget enhancement, CE (coverage enhancements) from a different category, e.g. Cat-M, may be reused for operation if desired. Overall, Cat-M operation may be used for all the common channels while UE-specific data may be handled according to Cat-A requirements (for a Cat-A UE). Thus, a Cat-A device may also have modes of operation associated with other device categories. In some embodiments, a Cat-A device may have Cat-1 and/or Cat-M modes of operation, which means that the Cat-A UE may use some PHY channels and/or procedures that are specific to (associated with) those different categories. For example, Cat-1 mode of operation means use of PDCCH, and Cat-M mode of operation means use of MPDCCH and narrowband (1.4 MHz) operation. It should be noted that the modes of operation described above are also referred to herein as "operating according to a different device category". For example, when a (Cat-A) UE is said to be operating according to Cat-1, it means that the Cat-A UE uses some channels and/or procedures that are specific to Cat-1, while the UE remains identified as a Cat-A device.

UL communications may always take place in a narrowband mode of operation. For example, during UL operations, the UE may operate in at most (i.e. maximum) a specified first bandwidth, e.g. 3 MHz bandwidth. During DL communications, the UE may operate in a second specified bandwidth, e.g. a 10 MHz bandwidth, independently of the system bandwidth, or the UE may operate in the system bandwidth. Furthermore, in some embodiments, a Cat-A device may always operate in asymmetric bandwidths for UL and DL operations. In other words, in some embodiments, a Cat-A device may operate in a specified first (or first size) bandwidth for DL operations and a specified second (or second size) bandwidth for UL operations, where the first bandwidth differs from the second bandwidth. It should be noted that in this context the bandwidth references the size of the bandwidth and not any specific frequency range associated with the bandwidth. For example, a specified first bandwidth may be situated at any specified or designated region of the frequency spectrum per the specific RAT designation(s).

Consequently, if a narrowband mode of operation in DL is justified by the architecture, then a Cat-A device may operate in a specified system band for efficiency, e.g. in 10 MHz for energy efficiency (it should be noted that operating in a 1.4 MHz band has an impact on power consumption for heavy DL traffic). For link budget enhancement and common channels, a Cat-A UE may operate using features, channels and/or procedures specific to a Cat-M device (i.e. operate in a 1.4 MHz bandwidth). In a way, during some time periods the UE may be said to switch from operating as a Cat-A device to operating as a Cat-M device. However, as mentioned above, this doesn't mean that the UE changes its category designation or that the category designation of the UE is redefined/modified. In some embodiments, this change in mode of operation includes changing the mode of operation for the PHY channels and the system bandwidth. For example, if link budget enhancements are needed, the UE may operate in 1.4 MHz bandwidth and use the MPDCCH as a Cat-M device would, but the UE still remains a Cat-A device.

Defining Cat-A in terms of Cat-1

In some embodiments, Cat-A may be defined in terms of Cat-1 with narrowband operation in UL/DL. That is, a Cat-A device may be considered a Cat-1 device with a single receive (RX) antenna, and may reuse Cat-M agreements for common channels (RAR/Paging/SIB) and extensions if needed, and may further use of Cat-M mode (i.e. MPDCCH, time domain repetitions and 1.4 MHz) in idle mode and during attach procedure. For UL, if new RACH preambles are introduced in Cat-A, the PUCCH may differ, while in Cat-M, PUCCH is restricted to 1.4 MHz whereas Cat-A operates according to legacy PUCCH.

As soon as RRC connection reconfiguration is complete, the UE may be operating as a fully Cat-A device, i.e. it may use EPDCCH for UE-specific data, and operate in 10 MHz in DL mode, and in 3 MHz in UL mode. For a link budget improvement higher than 5 dB and QoS requirements that are not sensitive, the UE may switch to a Cat-M mode of operation as previously described (in other words, the UE may remain a Cat-A device while using a mode of operation specific to or associated with Cat-M), i.e. operating in a 1.4 MHz band with time domain repetitions. For a link budget improvement lower than 5 dB, the UE may switch to a Cat-1 mode of operation. For QCI1 (e.g. real-time applications, VoLTE or similar QoS, QoS that are sensitive for e.g. real-time applications)/Heavy DL throughput and regardless of the link budget improvement needed (i.e. be it more than 5 dB or less than 5 dB), the UE may again switch to a Cat-1 mode of operation.

The switch from operating according to a mode of operation associated with one category to operating according to a mode of operation associated with another category may be performed at the eNB through RRC signaling. The UE may be identified as a Cat-A device, but based on the link budget, the QoS and/or the throughput/power consumption requirements, the eNB may enable the most appropriate (or most advantageous) mode of operation (e.g. PHY channels like MPDCCH, 1.4 MHz mode of operation, EPDCCH, common channels procedures, etc.) The switch may be requested by the wireless communication device (e.g. in form of MAC CE/RRC signaling) or it may be triggered by the NW based on measurements available at the NW (e.g. RSRP/CQI/PHR/BSR/BLER, etc.) It should also be noted that while there are at least three modes of operation of a Cat-A device disclosed herein, operation of Cat-A devices is not restricted to the examples provided herein. For example, in some embodiments, when certain conditions are met a Cat-A device may operate according to procedures and/or use of channels associated with other device categories not specifically mentioned herein, in addition to Cat-1 and Cat-M modes of operation. Furthermore, a Cat-A device may operate according to the requirements specified for a Cat-A device at all times, while under certain conditions—as also previously disclosed herein—the device may switch between performing respective operations according to corresponding procedures and/or use of channels associated with different categories.

Figure 5:
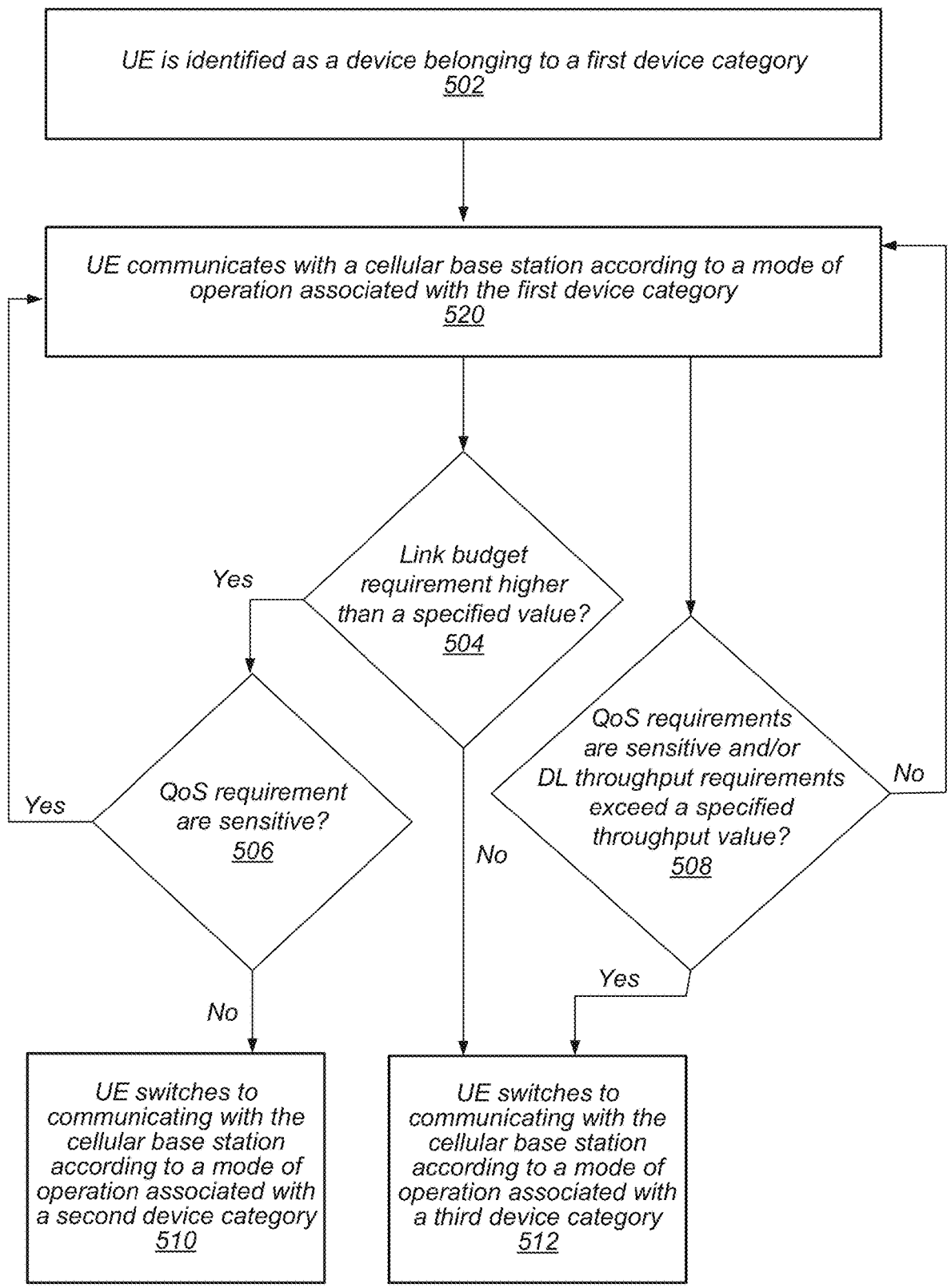
FIG. 5 shows an exemplary flow diagram illustrating communication between a UE and a base station, according to some embodiments.

FIG. 5 shows an exemplary flow diagram illustrating communications between a UE and a cellular base station according to some embodiments. The UE may be identified as belonging to a first device category, which may be a new device category (or type) such as Cat-A as disclosed above (502). The UE may communicate with a cellular base station according to a mode of operation associated with (or specific to) the first device category (520). If the link budget requirement exceeds a specified value (504) and the QoS requirements are not sensitive, i.e. the QoS requirements don't meet certain criteria (506), the UE may switch to communicating with the cellular base station according to a mode of operation associated with a second device category, e.g. associated with a pre-existing device category such as Cat-M in some embodiments (510). If the link budget requirement does not exceed the specified value (504), the UE may switch to communicating with the cellular base station according to a mode of operation associated with a third device category, e.g. associated with another pre-existing device category such as Cat-1 in some embodiments (512). Furthermore, if the QoS requirements are sensitive, i.e. they meet certain criteria, and/or downlink throughput requirements exceed a specified throughput value (508), the UE may switch to communicating with the cellular base station according to the mode of operation associated with the third device category (512).

Control Channels in LTE

LTE defines a number of downlink (DL) physical channels, categorized as transport or control channels, to carry information blocks received from the MAC and higher layers. LTE also defines three physical layer channels for the uplink (UL).

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information or Indicator (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM).

The Physical Hybrid ARQ Indicator Channel (PHICH) is a DL control channel that carries the HARQ acknowledge/negative-acknowledge (ACK/NACK), indicating to the UE whether the eNB correctly received uplink user data carried on the PUSCH. Information over the PHICH is typically BPSK (binary phase shift keying) modulated.

The Physical Control Format Indicator Channel (PC-FICH) is a DL control channel that carries the Control Frame Indicator (CFI) which includes the number of orthogonal frequency-division multiplexing (OFDM) symbols used for control channel transmission in each subframe (typically 1, 2, or 3). The 32-bit long CFI is mapped to 16 Resource Elements in the first OFDM symbol of each downlink frame using QPSK modulation.

Therefore, as indicated above, during data communication over LTE, the DL uses the physical channel PDSCH, while in UL it uses the UL channel PUSCH. As also mentioned above, these two channels convey the transport blocks of data in addition to some MAC control and system information. To support the transmission of DL and UL transport channels, Downlink Shared Channel (DLSCH) and Uplink Shared Channel (UL-SCH) control signaling is required. This control information is sent in PDCCH and it contains DL resource assignment and UL grant information. PDCCH is sent in the beginning of every subframe in the first OFDM symbols. Depending on the level of robustness and the PDCCH system capacity (numbers of users to be simultaneously served in a TTI) the NW needs to achieve, PDCCH will be transmitted in either the first 1, 2, 3, or 4 OFDM symbols of a subframe. The number of OFDM symbols used in PDCCH is typically signaled in PCFICH.

Control Channel Considerations for Cat-A

One limitation during DL operations may be the control channel, PDCCH. EPDCCH is UE-specific and is used in RRC-connected mode and cannot be used for common channels like paging, SIB, etc. PDCCH may be replaced for Cat-A devices according to at least two different solutions. In a first solution, the EPDCCH may be extended to be used for idle mode and common channels, SIB/RAR/Paging. For RAR and Paging it may include a definition of new reserved preambles for RACH, and a new UE_ID for paging for this new category (Cat-A) devices.

In a second solution, the MPDCCH may be reused for RAR/Paging and MTC_SIB may be used (where MTC stands for machine-type communications), while EPDCCH may be used for UE-specific data. It should be noted that MTC_SIB does not require a PDCCH. Consequently, RAR and Paging may be operating in narrowband (e.g. 1.4 MHz) like a Cat-M device. Before RRC connection reconfiguration is reached, MPDCCH may be used. Once RRC connection reconfiguration has been reached, a complete switch to EPDCCH may take place since EPDCCH in the specification is UE specific and used only in RRC connected mode. Thus, to use EPDCCH, a configuration is expected from the network, and that configuration may be received in an RRC connection reconfiguration transmission.

Furthermore, MTC_SIB may be made to cover all legacy SIBs. Since an MTC device may not support mobility, SIB4/5 may most likely not be redefined for MTC. Hence for Cat-A, new SIBs 4/5/10/11/12 may be created. SIBs 4 and 5 may be for mobility, SIBs 11 and 12 may be for emergency calls as the new category supports emergency calls. Overall, the new SIBs may be created to operate without PDCCH, i.e. they may operate without using PDCCH as MTC_SIB. The PRB s pairs used for EPDCCH may be restricted to fit a specified bandwidth, which is 10 MHz in some embodiments. Prior to attaching to the NW, the UE may be operating using physical channels and/or procedures associated with a different category mode, e.g. Cat-M mode, while the UE may still be identified as a Cat-A device. In other words, the UE may not be identified as Cat-M device, but at the same time the UE may use MPDCCH and common channels (SIB/RACH/Paging) as defined for (associated with) Cat-M because MPDCCH and the above referenced common channels support a narrowband mode of operation (1.4 MHz). An example code sequence corresponding to EPDCCH configuration is shown below:

---

EPDCCH-SetConfig-r11 ::= SEQUENCE {
setConfigId-r11 EPDCCH-SetConfigId-r11,
transmissionType-r11 ENUMERATED {localised, distributed},
resourceBlockAssignment-r11 SEQUENCE{
numberPRB-Pairs-r11 ENUMERATED {n2, n4, n8},
resourceBlockAssignment-r11 BIT STRING (SIZE(4..38)) // This may be restricted to fit in 10 MHz
},

---

Expanded Cat-A Control Channel Operations

As mentioned above, in the 3GPP LTE standard, the Physical Downlink Control Channel (PDCCH) is used as the control channel and is transmitted over the entire bandwidth in the first few OFDM symbols of a subframe. A subframe generally comprises 14 OFDM symbols (normal cyclic prefix) of which one to four symbols can be used for PDCCH. An additional control channel—also defined in 3GPP—and transmitted in the PDSCH portion of a subframe is called an Enhanced PDCCH or EPDCCH. The EPDCCH may be assigned to UE's once they are in the network, and may only be assigned to a UE in an RRC-connected state. Thus the EPDCCH assigned to a UE can carry control channels directed to a specific UE, which is referred to as UE-specific search-space (SS). In other words, once the UE is in a connected state the network might assign the UE certain resources. However, these resources are not exclusively assigned and may be reused by the network for regular PDSCH. The EPDCCHs may be decoded blindly by the UE on the assigned EPDCCH resources according to the specified procedures to match with its C-RNTI (Cell Radio Network Temporary Identifier) in a DCI.

In some embodiments, the idea of EPDCCH is extended to a common SS as described in U.S. patent application Ser. No. 15/076,967, which makes paging Downlink Control Information (DCIs with Paging RNTI, or P-RNTI) on EPDCCH possible. The common SS may also be used for system information messages (with System Information RNTI, or SI-RNTI). Extending EPDCCH in this manner is useful at least because Cat-A devices may be limited in bandwidth (BW). E.g. while a cell BW may be 20 MHz, a Cat-A device might be operating with a 10 MHz BW. In that case the Cat-A device may not be able to decode PDCCH anymore, and may need to rely on EPDCCH.

3GPP Release 13 also defines a control channel for MTC class of devices or Cat-M devices, labelled MPDCCH. MPDCCH is similar to EPDCCH, but the BW of MTC class devices is limited to 6 RBs, and there are also special DCIs defined for MTC class devices. As mentioned above, a new category device, specifically named Cat-A device may be defined with some specific needs. The Cat-A devices may potentially decode all different control channels: PDCCH, EPDCCH on UE-specific SS, EPDCCH on common SS, and MPDCCH.

Thus, further extensions to the control channel structure(s) may be implemented to service Cat-A devices. Specifically, the concept of EPDCCH may be extended to common SS, and some of the resources for EPDCCH on UE-specific SS, and EPDCCH on common SS may be optionally shared. In other words, the resources for two search spaces may be overlaid partially or in full, giving the network more flexibility in allocating resources. Furthermore the DCI formats for MPDCCH may be extended to Cat-A devices, which enables the coverage enhancement of MTC for Cat-A devices. Because Cat-A devices can use up to fifteen (15) resource blocks (RBs) whereas MTC devices are limited to 6 RBs, new DCI formats enable Cat-A devices to operate/function properly when using MPDCCH.

EPDCCH

Per 3GPP LTE specs, EPDCCH assignments are made for UE-specific search space. The assignment of EPDCCH to a UE is made after the RRC connection with the UE has been established. The EPDCCH is therefore not used for UEs that are in RRC-Idle state. Two sets of up to eight (8) RBs may be allocated for EPDCCH for a UE. Each RB may carry four (4) ECCEs. The EPDCCH thereby allows higher aggregation levels (L=16, 32) compared to PDCCH (L=8). It should be noted however that for normal subframes an ECCE includes 4 EREGs but an EREG does not always contain nine (9) REs, and thus an ECCE (of EPDCCH) may contain less than 36 REs. In contrast, a CCE of PDCCH always contains thirty six (36) REs.

The space allocated for EPDCCH may be used for PDSCH on discretion of the eNB (base station). It is desirable for the UEs to be able to use EPDCCH for receiving paging messages, especially when a UE is link-budget limited. Accordingly, as previously mentioned, the proposal to extend use of the EPDCCH to the common search-space (SS) was presented in U.S. Provisional patent application Ser. No. 15/076,967. Extending use of the EPDCCH to the common SS makes it possible for transmitting paging DCIs (with P-RNTI) on EPDCCH. The common SS may also be used for system information messages (with SI-RNTI). Therefore, UEs that are in RRC-Idle mode may monitor the EPDCCH in the common SS. Consequently, the common SS is meant for UEs that are in RR-Idle mode, while UEs in RRC-connected state may be assigned EPDCCH resources for the UE-specific SS. In general, the EPDCCH resources (RB pairs) for common SS and UE-specific SS do not overlap.

EPDCCH may be transmitted in distributed transmissions or localized transmissions. The PRB pairs that make up a PRB set for EPDCCH may be contiguous or spread over the transmission bandwidth (as set forth in the 3GPP standard). The former is likely to be used with localized transmissions while the latter is more suited for distributed transmissions. An EPDCCH includes a specified number 'L' of ECCEs, where L denotes the aggregation level. An ECCE includes four EREGS. For localized transmission, the four EREGs of an ECCE lie in the same PRB pair. For distributed transmission the four EREGs of an ECCE may lie in different PRB pairs (as also set forth in the 3GPP standard). That is, each control channel may include several ECCEs, and for localized transmissions, one ECCE may be contained wholly in one PRB pair, while for distributed transmissions, components of the ECCE (i.e. EREGs) may be contained in different PRBs. It may be assumed that the EPDCCH on common SS is chosen to be either transmitted distributed or localized. The localized and distributed transmission cases are further explained in detail below.

Resource Allocations for Distributed Transmission

Figure 6:
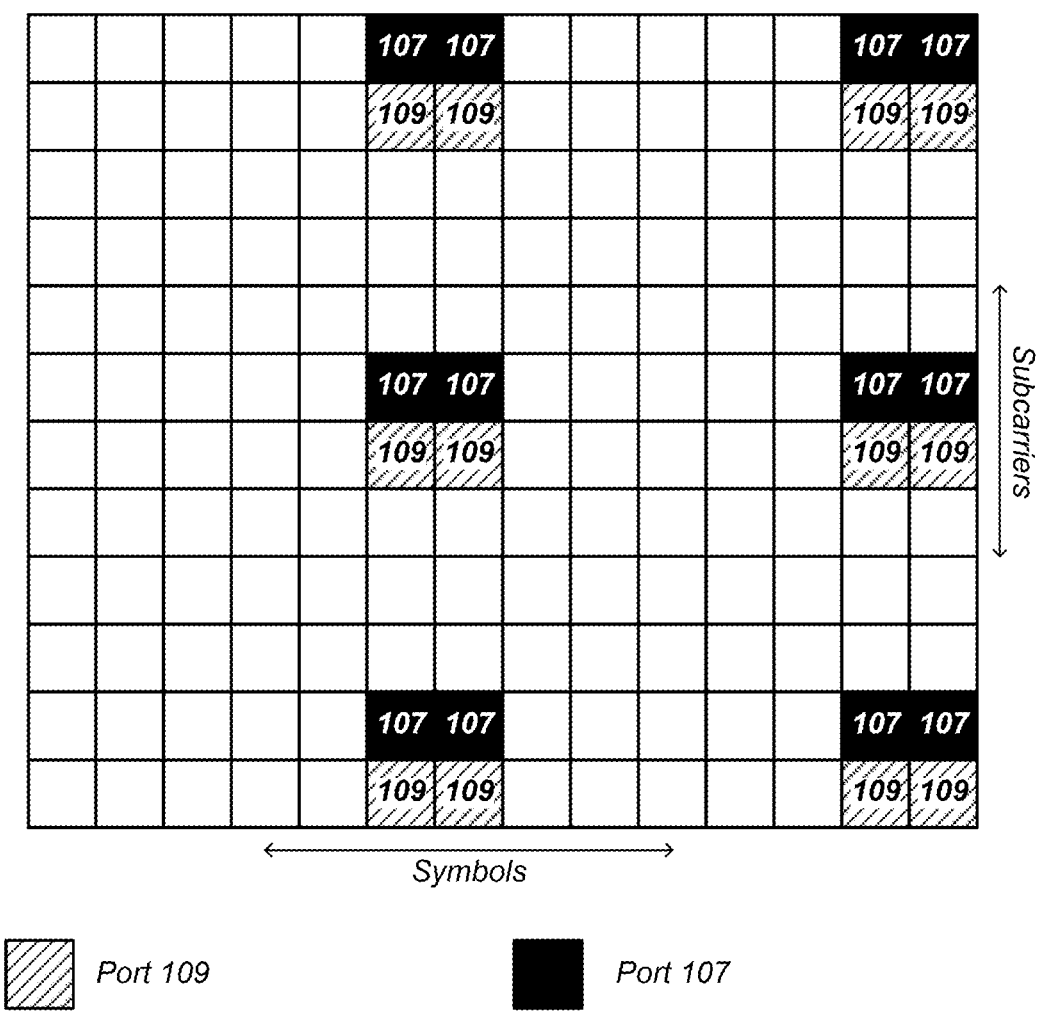
FIG. 6 shows a resource allocation diagram illustrating DMRS in an exemplary physical resource block pair when used for EPDCCH for distributed transmission.

FIG. 6 shows a resource allocation diagram illustrating an exemplary physical resource block pair when used for EPDCCH for distributed transmission. For decoding EPDCCH, Cell-Specific Reference Signals (CRS) are not used. Instead Demodulation Reference Signals (DMRS) are defined in each PRB pair carrying EPDCCH. For distributed transmission of EPDCCH, two transmission ports denoted 107 and 109 are used for DMRS with alternate REs in EREGs using port 107 and 109 (as set forth in the 3GPP standard). The two different types of shaded areas in FIG. 6 (and in subsequent figures as well) are used to denote the different transmission ports as indicated by the legend in each figure. The transmission ports may correspond to physical antennas. E.g., port 107 may be transmitted on a first antenna and port 109 may be transmitted on a second antenna. Implementation dependent beamforming may be used on both ports independently.

FIG. 6 illustrates a PRB pair when used for EPDCCH (for normal cyclic prefix and on a normal subframe). There are 14 OFDM symbols and 12 subcarriers. The PRB pair has 16 DMRS (Demodulation Reference Signal) REs and 144 other REs for a total of 168 REs. The lightly shaded squares denote DMRS transmitted on port 109, while the darkly shaded squares denote DMRS transmitted on port 107.

Figure 7:
FIG. 7, shows a resource allocation diagram illustrating an exemplary physical resource block pair when used for EPDCCH for distributed transmission on UE-specific search space.
Figure 7:

FIG. 7 shows a resource allocation diagram illustrating an exemplary physical resource block pair when used for EPDCCH for distributed transmission on UE-specific search space. A PRB pair may contains 16 EREGs, labeled 0 to 15. Each specific EREG "i" (where "i" represents a numeric indicator) includes 9 REs labeled "i" for normal cyclic prefix in a normal subframe. E.g., there are nine squares with a "1" in them, 9 squares with a "2" in them, etc. The REs used for other purposes (e.g., PDCCH, CRS) are labeled in EREGs for EPDCCH but not used for EPDCCH. For distributed EPDCCH, antenna ports 107 and 109 are used for DMRS. The alternate REs in an EREG use ports 107 and 109 for transmission. Implementation dependent beamforming may be used on both ports independently. An example is shown for REs that include EREG '1', with the darker shading denoting port 107 and the lighter shading denoting port 109 for an RE. This is per 3GPP TS standard for EPDCCH on UE specific SS for distributed transmission on EPDCCH.

Overall, two sets of ports are used for transmission of reference symbols in distributed transmission.

Figure 8:
FIG. 8 shows a resource allocation diagram illustrating an exemplary physical resource block pair when used for EPDCCH for distributed transmission with some resource blocks allocated for common search space overlaid with a UE-specific search space, according to some embodiments.
Figure 8:

FIG. 8 shows a resource allocation diagram illustrating an exemplary physical resource block pair when used for EPDCCH for distributed transmission with some resource blocks allocated for common search space overlaid with a UE-specific search space, according to some embodiments. It is proposed that for the common search space the alternate REs of an EREG may be transmitted on ports 109 and 107 (complement of UE specific SS). An example is shown in FIG. 8 for REs comprising EREG '1', with the light shading denoting port 109 and darker shading denoting port 107 for an RE, in contrast with the port assignments for the same REs shown in FIG. 7. This allows reusing REs similar to a multi-user MIMO environment. It provides possible sharing of RBs for EPDCCH on common SS and a UE-specific SS. Thus, some of the RBs allocated for common SS may be overlaid with a UE-specific SS for some UEs, which allows the network (or eNB or managing base station) more flexibility in allocating resources for EPDCCH. In one sense, if the common SS and the UE-specific SS share some PRB pairs, the order of transmission may be "reversed" insofar that if in the UE-specific SS the REs are transmitted on port 107, on the common SS the REs may be transmitted on port 109. In practice, only a few of the PRB pairs from the set of PRB pairs for two EPDCCH SSs may be shared, which may limit "multi user" interference. It may be assumed that the common SS EPDCCH follows distributed transmission and the shared PRB pairs of the UE-specific SS also follow distributed transmission.

Figure 9:
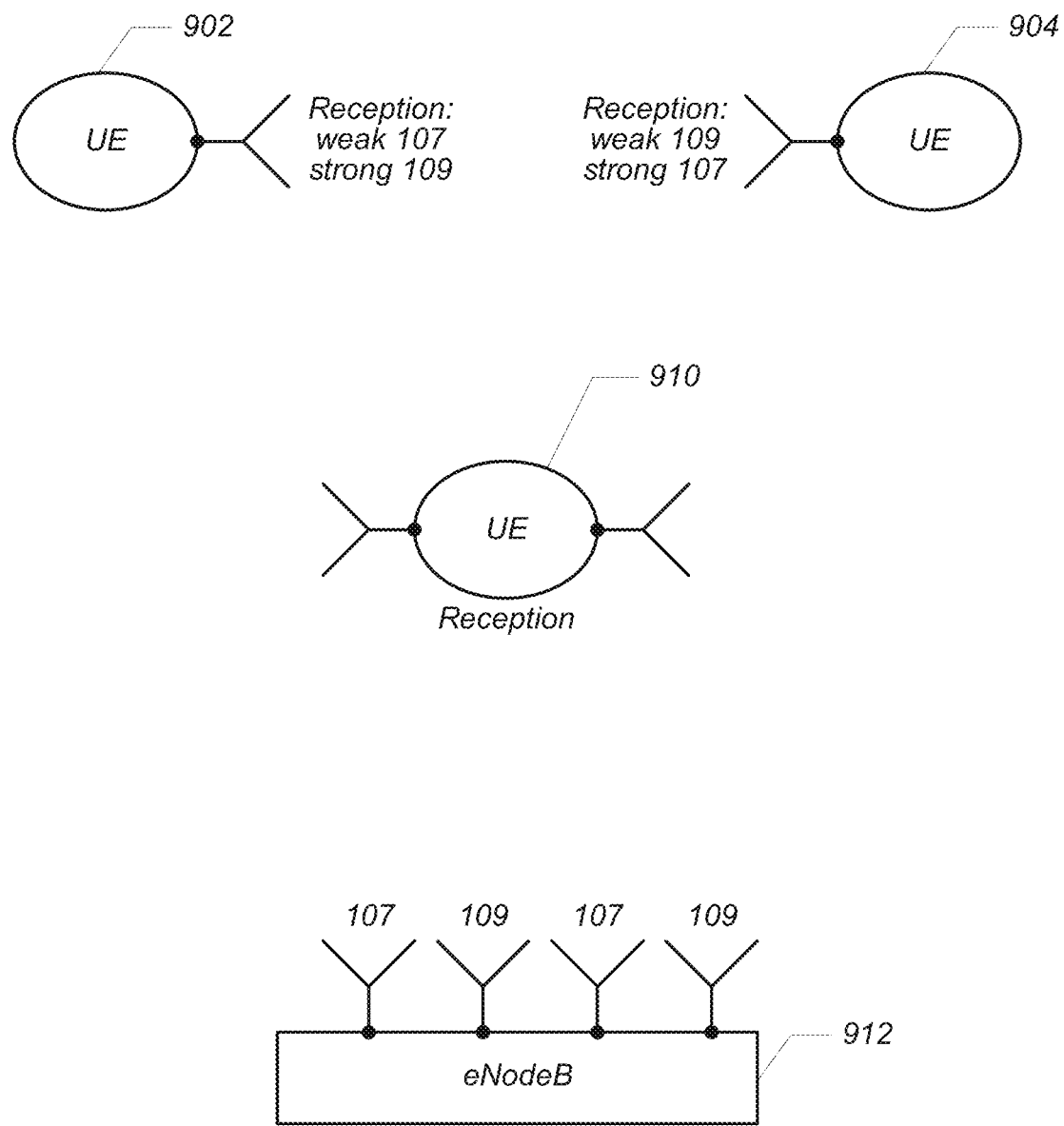
FIG. 9 shows a diagram illustrating how receive antennas may be used for receiving physical control channel information, according to some embodiments.

Distinguishing between Common SS and UE-specific SS when some PRB Pairs are Shared FIG. 9 shows a diagram illustrating how receive antennas may be used for receiving physical control channel information, according to some embodiments. If the UE is equipped with two receive (RX) antennas (such as UE 910) then it may decode both transmissions using spatial multiplexing receiver (normal MIMO). However, if the UE is only equipped with one antenna (such as UEs 902 and 904), there may be no easy way of distinguishing between the two transmissions. Oftentimes one port might be stronger than the other port in the UE (e.g. 107 stronger in one UE, 109 stronger in another UE, as illustrated in FIG. 9). Some interference may be present, but it may be overcome by interference cancellation techniques, such as forward error correction coding and by the fact that not all resources are shared between the common SS and UE-specific SS, i.e. only some PRB pairs may be shared. In other words, per the channel between eNB and a UE, an RE from antennas 107 may appear weaker while it may appear stronger from antennas 109, and vice versa. Accordingly, at a UE, for a given SS, the interference from the other SS may be overcome by using forward error correction (FEC). It should be noted that an ECCE in a distributed transmission has four EREGs but they are not transmitted on the same PRB. One EREG might be on one PRB pair, another EREG might be on a second PRB pair, etc. Accordingly, some of the EREGs may be expected to be free of or largely unaffected by interference. As illustrated by 912, a base station (eNB) may transmit an RE of one search-space on antennas 107 and an RE for the other SS on antennas 109, using the same time-frequency resource.

Resource Allocations for Localized Transmission

Figure 10:
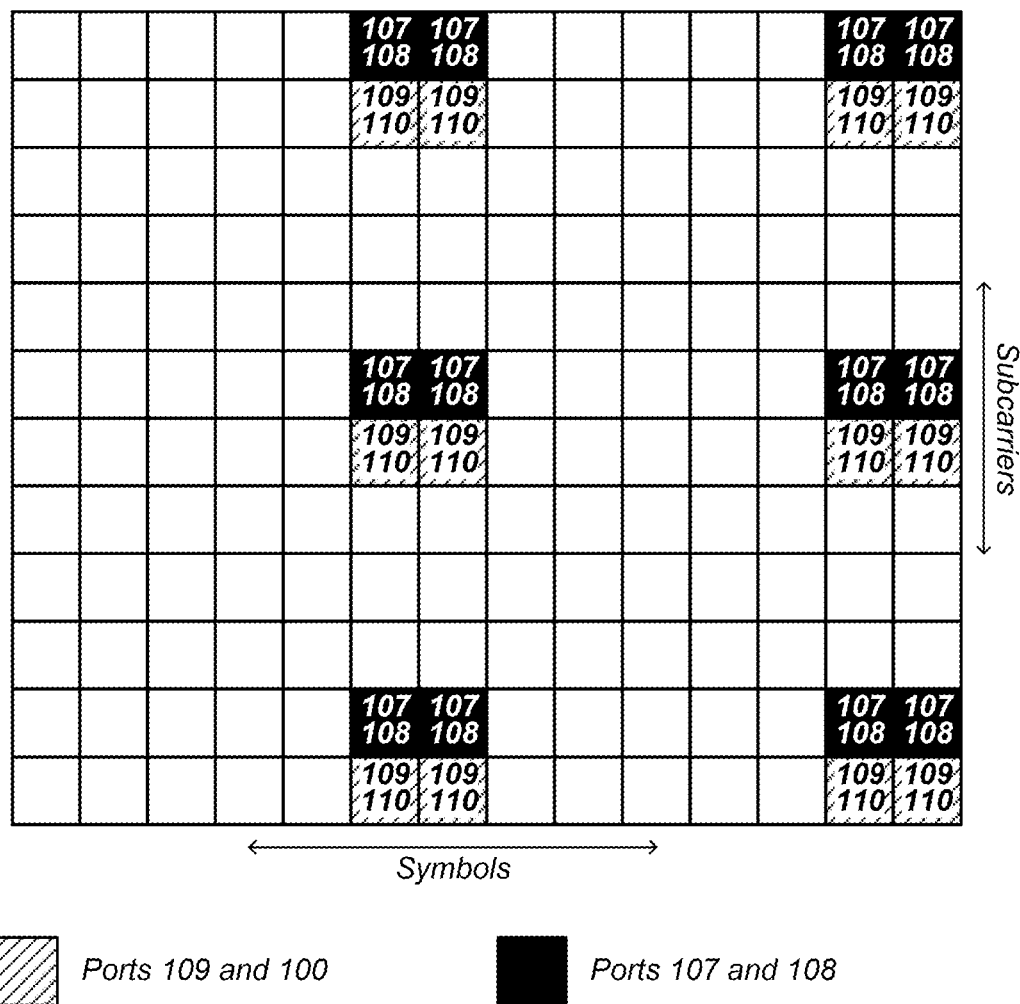
FIG. 10 shows a resource allocation diagram illustrating DMRS in an exemplary physical resource block pair when used for EPDCCH for localized transmission.

FIG. 10 shows a resource allocation diagram illustrating an exemplary physical resource block pair when used for EPDCCH for localized transmission. For localized transmission of EPDCCH, four transmission ports, here denoted as 107, 108, 109, and 110 are used for DMRS. The DMRS pairs 107, 108 and 109,110 are CDM separated (as set forth in the 3GPP standard). FIG. 10 shows a PRB pair with 16 DMRS REs and 144 other REs for a total of 168 REs. The lightly shaded squares denote DMRS transmitted on port 109, 110, while darkly shaded squares denote DMRS transmitted on port 107, 108. As indicated, for localized transmission four ports rather than two ports may be used.

Figure 11:
FIG. 11 shows a resource allocation diagram illustrating an exemplary physical resource block pair when used for EPDCCH for localized transmission on UE-specific search space.
Figure 11:

FIG. 11 shows a resource allocation diagram illustrating an exemplary physical resource block pair when used for EPDCCH for localized transmission on UE-specific search space. For a localized transmission of a particular EPDCCH with a specified number 'L' of ECCEs, the REs that include the ECCEs are transmitted on one of the four antenna ports. The antenna port is selected pseudo-randomly based on UE identity and the starting ECCE index of the particular EPDCCH, as set forth in the 3GPP standard. An example is shown for an EPDCCH of one ECCE (L=1; EREGs 2, 6, 10, 14) transmitted on port 107. The REs of the particular EPDCCH are shown in the darkly shaded squares. Note however that REs used for other purposes (e.g., PDCCH, CRS) are not used for EPDCCH.

Figure 12:
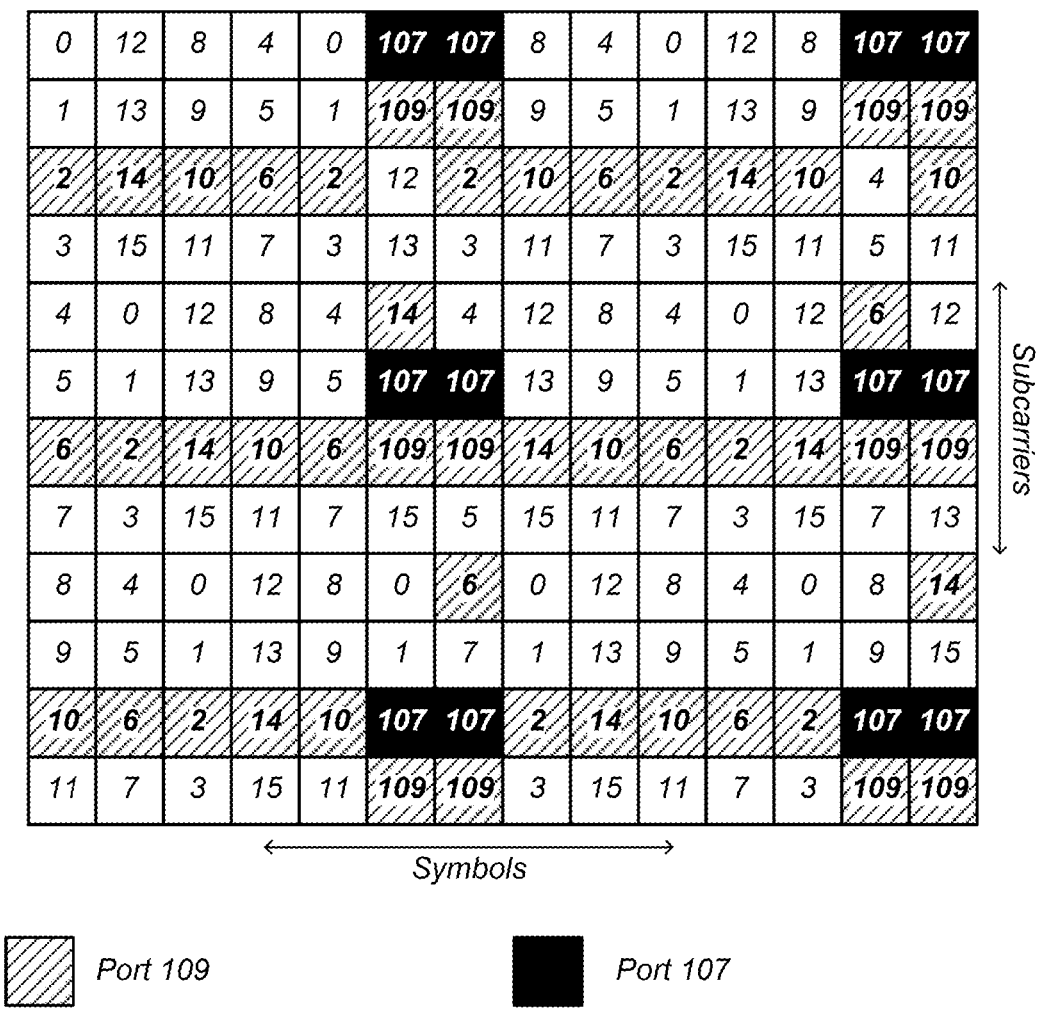
FIG. 12 shows a resource allocation diagram illustrating an exemplary physical resource block pair when used for EPDCCH for localized transmission with some resource blocks allocated for common search space overlaid with a UE-specific search space, according to some embodiments.

FIG. 12 shows a resource allocation diagram illustrating an exemplary physical resource block pair when used for EPDCCH for localized transmission with some resource blocks allocated for common search space overlaid with a UE-specific search space, according to some embodiments. It is assumed that the common SS EPDCCH follows localized transmission and the shared PRB pairs of the UE-specific SS also follow localized transmission. If on the shared PRB pair, the ECCEs in (or of) a UE-specific SS EPDCCH are being transmitted on port 107, then the same ECCEs may be used for an EPDCCH on common SS using port 109. An example is shown in FIG. 12 for an EPDCCH of one ECCE (L=1; EREGs 2, 6, 10, 14) transmitted on port 109. The REs of the particular EPDCCH are shown in the lightly shaded squares. It should be noted, however that REs used for other purposes (e.g., PDCCH, CRS) are not used for EPDCCH. Generally, when using the common SS, the same port cannot be used, instead the port denoted by the light shading is used. Multi-user MIMO may be used in UE-specific SS. The same resources, e.g. on the port denoted by the darker shading, are used for one UE, and on the same resources another EPDCCH may be transmitted using one of the other three ports. Thus, multi-user MIMO may be used on the same resources.

Overlay Reception of EPDCCH

Decoding of the EPDCCH with localized transmission may be performed as follows. The UEs on common SS may use the port-number as an additional hypothesis. Alternatively, common SS EPDCCH may always be sent using a predetermined antenna-port. The UE requiring the same antenna port (as previously explained) may not be scheduled in that subframe for that particular ECCE(s) depending on the aggregation level. The predetermined antenna port for common SS may be a function of the subframe number and physical cell ID. The UEs with two RX antennas may preferably use a spatial multiplexing receiver to simultaneously decode transmissions from the port for common SS and the ports from UE-specific ports. Since the total number of ports is specified (e.g. four), the decoding complexity may increase. Some rules may be used by the network to ease this complexity. For example, if a common EPDCCH is transmitted on a shared PRB on port 107, the NW may not schedule any UE on UE-specific SS that requires ports 108 or 110. Therefore, in this example the spatial multiplexing receiver may assume transmissions only on ports 107 and 109. In other words, the network (eNB) may ensure that nothing is scheduled on the UE-specific SS if the port numbers clash. Transmissions may proceed for different port numbers. In this way, some of the RBs allocated for common SS may be overlaid with a UE-specific SS for some UEs. This allows the eNB more flexibility in allocating resources for EPDCCH. In practice, only a few of the PRB pairs from the set of PRB pairs for two EPDCCH SSs may be shared, limiting "multi user" interference.

EPDCCH—Extended Cyclic Prefix and Other Subframe Types

For extended cyclic prefix, DMRS may be transmitted on ports 107 and 108, which share the same REs but are distinguished by CDM (code division multiplexing). For distributed transmission on common SS, an RE may be transmitted on the port on which the UE-specific SS is not transmitting. Similarly for localized transmission, if the UE-specific ECCE is being transmitted on port 107, the common SS ECCE may be transmitted on port 108, and vice versa. For special subframes, the number of symbols is smaller and hence the number of available REs is smaller. The locations of DMRS are also different. However, the common SS and UE-specific SS may be overlaid as described above.

Control Channels for MTC

As previously mentioned, 3GPP LTE uses PDCCH as the control channel which is transmitted over the whole bandwidth in the first few OFDM symbols of a subframe. As also mentioned, a subframe generally consists of 14 OFDM symbols of which one to four symbols can be used for PDCCH. For economy of power consumption and reduced device complexity, Cat-M devices are defined to receive and transmit in 1.4 MHz (6 PRBs) portions of the full LTE bandwidth. (The full bandwidth is typically 5 MHz, 10 MHz, 15 MHz, 20 MHz). Thus Cat-M devices cannot use PDCCH. Therefore the mechanism of EPDCCH is used to define a control channel called MPDCCH. MPDCCH, as defined, has both the common and user search spaces and thus supports broadcast (SIBs) and paging. MPDCCH is similar to EPDCCH but is restricted to 6 contiguous PRBs, and uses the concept of "repetition levels" to span one or multiple subframes.

For Cat-M devices, two modes are defined, called coverage enhanced modes A and B (CE mode A, and CE mode B). Modes A and B differ in that they feature different repetition levels for the PDCCH. Mode B has more repetition levels for MPDCCH and thus improves the coverage more than mode A. Two corresponding DCI formats A and B are proposed for modes A and B, and each contains one UL DCI and one DL DCI format. That is, one DCI format may be defined for UL and one DCI format may be defined for DL, with the number of DCI bits kept as small as possible.

MPDCCH for Cat-A Devices

The framework defined for Cat-M may be utilized by a different category of UEs which may be to a degree link-budget limited but have different requirements in terms of throughput and/or real-time traffic such as VoLTE. One such class of devices—described above—is tentatively referred to as Cat-A devices. For a Cat-A device, DL allocations may be restricted to 50 RBs or less (even on a 20 MHZ bandwidth with 100 RBs) and the UL allocations may be restricted to 15 RBs or less. Cat-A devices in a link-budget-limited scenario may use MPDCCH as the control-channel (a Cat-A device may also use PDCCH and EPDCCH as options). For example, when operating on a 20 MHz cell but only supporting 10 MHz, PDCCH cannot be used but either EPDCCH or MPDCCH may be used. Thus, in very poor link conditions, MPDCCH mode may be mimicked. However, the DCIs defined for Cat-M are only suitable for 1.4 MHz devices, therefore there is a need to define DCI formats for Cat-A devices as MTC is limited to 6 RBs.

Since the allocations for Cat-M devices is limited to 6 RBs, the allocation in DCIs is split into two parts. Since Cat-A is limited to 15 RBs in UL, similar simplification in specifying the allocation similar to CE mode DCI formats may be allowed. A proposed UL DCI format for Cat-A devices may thus include a narrowband index value with a field size defined as "ciel(log2(number of narrowbands)), and a PRB assignment value with a specified field size "n". The narrowband index is representative of the total BW divided into portions of 15 RBs and the PRB assignment is representative of the PRB location within the configured narrowband.

Cat-A devices may be limited to a maximum of 50 RBs in DL. For BW>10 MHz, and a narrowband index in DL DCI may select/determine a band of 50 RBs. Since the lengths of DCIs for Cat-A may be different than the lengths of DCIs for Cat-M, these may be easily discriminated in the receiver. Therefore, this definition of DCIs may have no effect on MTC devices. A proposed DL DCI format for Cat-A devices may thus include a narrowband index value with a field size defined as "ciel(log2(number of narrowbands)), and a PRB assignment value with a specified field size "n". The narrowband index is representative of the total BW divided into portions of 50 RBs and the PRB assignment is representative of the PRB location within the configured narrowband.

In general, the above defines which narrowband is selected on the total BW, and what the PRB assignment is within the selected narrowband. The DCI format may be different than the DCI format for Cat-M. If a DCI for a Cat-A device is transmitted, the Cat-M device is not able to decode that DCI because the length of the DCI is different. This avoids clashing with other UEs. Hence the DCI length effectively differentiates between Cat-A devices and Cat-M devices.

MPDCCH Overlay

The MPDCCH is similar to EPDCCH but restricted to 6 contiguous PRBs. The MPDCCH may use localized or distributed transmissions. A PRB pair used for MPDCCH may thus be overlaid with an EPDCCH, provided it is assigned a port that is orthogonal (e.g. port 107 or port 108) to the one assigned to MPDCCH (e.g. port 109 or port 110).

Since localized transmission EPDCCH on UE-specific SS may have up to four different transmissions, it may complicate the decoding by the receiver if a PRB-pair is shared between UE-specific SS EPDCCH and common SS EPDCCH. Furthermore, for a given aggregation level, a single transmission port may be used for all ECCEs in/of a particular EPDCCH, and thus the port numbers that clash may limit the network flexibility in scheduling EPDCCHs. Due to the fact that MTC devices are possibly coverage limited single-antenna devices, overlaying resources may cause unacceptable interference, and thus is unlikely to be used. In other words, some resources may be shared between MPDCCH and EPDCCH, with some PRB pairs—but not all of them—overlaid. However, for localized transmissions it may not be as advantageous for MTC devices to share resources due to interference and the already limited BW associated with MTC devices.

Figure 13:
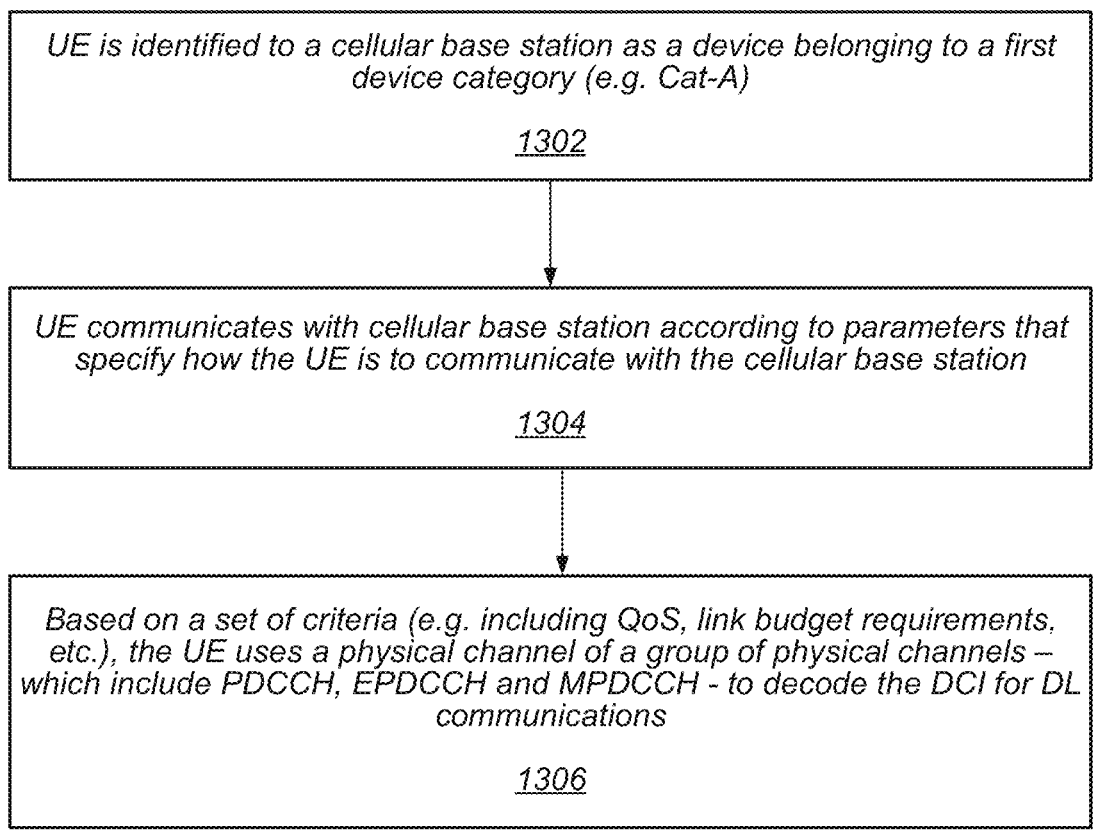
FIG. 13 shows an exemplary flow diagram illustrating wireless cellular communications of a UE, according to some embodiments.

Based at least on the above, wireless cellular communication of a UE according to some embodiments may be performed as illustrated in FIG. 13. The UE may be identified to a cellular base station as a device belonging to a first device category (e.g. Cat-A) for at least purposes of certain default resource allocations (1302). The UE may communicate with the cellular base station according to parameters that specify how the UE is expected to communicate with the cellular base station, based at least in part on the category designation of the UE (1304). For downlink communications, the UE may use any physical channel of a group of physical channels—which may include PDCCH, EPDCCH and MPDCCH—to decode the DCI, with selection of the physical channel based on a set of criteria, e.g. QoS and/or link budget requirements associated with various operations of the UE (1306).

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
 a processing element configured to cause a wireless communication device to:
  perform communications with a cellular base station, wherein the wireless communication device is identified to the cellular base station as a device that belongs to a first device category;
  operate according to a plurality of communication parameters that specify how the wireless communication device communicates with the cellular base station, based at least in part on the first device category;
  select, based on a set of criteria associated with one or more of the plurality of communication parameters, a physical control channel from among a plurality of physical control channels that includes a physical downlink control channel (PDCCH), an enhanced PDCCH (EPDCCH), and a Machine Type Communications PDCCH (MPDCCH); and
  decode Downlink Control Information (DCI), using the selected physical control channel.

2. The apparatus of claim 1, wherein the processing element is configured to further cause the wireless communication device to recognize which DCI of a plurality of DCIs on the MPDCCH to decode based at least on a length of the DCI.

3. The apparatus of claim 2, wherein the length of the DCI on the MPDCCH decoded by the wireless communication device is different from a length of other DCIs of the plurality of DCIs on the MPDCCH decoded by other devices belonging to a device category other than the first device category.

4. The apparatus of claim 1, wherein, for distributed transmissions, at least some resources are shared between the EPDCCH on common search space and one or more of the following:
 the MPDCCH; or
 the EPDCCH on wireless communication device-specific search space.

5. The apparatus of claim 4, wherein the at least some resources are shared by overlaying one or more but not all physical resource block pairs.

6. The apparatus of claim 4, wherein resource elements are transmitted on multiple respective ports, wherein the processing element is configured to further cause the wireless communication device to access the at least some resources through multi-user multiple-input-multiple-output (MIMO) methods.

7. The apparatus of claim 6, wherein sharing of the at least some resources is managed by the cellular base station and is transparent to the wireless communication device.

8. A wireless communication device comprising:
 radio circuitry configured to facilitate wireless cellular communications of the wireless communication device; and
 a processing element communicatively coupled to the radio circuitry and configured to cause the wireless communication device to:
  communicate with a cellular base station, wherein the wireless communication device is identified to the cellular base station as a device that belongs to a first device category;
  operate according to a plurality of communication parameters that specify how the wireless communication device communicates with the cellular base station, based at least in part on the first device category; and
  select, based on a set of criteria associated with one or more of the plurality of communication parameters, a physical control channel from among a plurality of physical control channels that includes a physical downlink control channel (PDCCH), an enhanced PDCCH (EPDCCH), and a Machine Type Communications PDCCH (MPDCCH); and
  decode Downlink Control Information (DCI), using the selected physical control channel.

9. The wireless communication device of claim 8, wherein the processing element is configured to further cause the wireless communication device to recognize which DCI of a plurality of DCIs on the MPDCCH to decode based at least on a length of the DCI.

10. The wireless communication device of claim 9, wherein the length of the DCI on the MPDCCH decoded by the wireless communication device is different from a length of other DCIs of the plurality of DCIs on the MPDCCH decoded by other devices belonging to a device category other than the first device category.

11. The wireless communication device of claim 8, wherein, for distributed transmissions, at least some resources are shared between the EPDCCH on common search space and one or more of the following:
    the MPDCCH; or
    the EPDCCH on wireless communication device-specific search space.

12. The wireless communication device of claim 11, wherein the at least some resources are shared by overlaying one or more but not all physical resource block pairs.

13. The wireless communication device of claim 11, wherein resource elements are transmitted on multiple respective ports, wherein the processing element is configured to further cause the wireless communication device to access the at least some resources through multi-user multiple-input-multiple-output (MIMO) methods.

14. The wireless communication device of claim 13, wherein sharing of the at least some resources is managed by the cellular base station and is transparent to the wireless communication device.

15. A non-transitory memory element storing instructions executable by a processing element to cause a wireless communication device to:
    perform wireless communications with a cellular base station, wherein the wireless communication device is identified to the cellular base station as belonging to a first device category;
    operate according to a plurality of communication parameters that specify how the wireless communication device performs the wireless communications with the cellular base station, based at least in part on the first device category;
    select, based on a set of criteria associated with one or more of the plurality of communication parameters, a physical control channel from among a plurality of physical control channels that includes a downlink control channel (PDCCH), an enhanced PDCCH (EPDCCH), and a Machine Type Communications PDCCH (MPDCCH); and
    decode Downlink Control Information (DCI), using the selected physical control channel.

16. The non-transitory memory element of claim 15, wherein the instructions are executable by the processing element to further cause the wireless communication device to recognize which DCI of a plurality of DCIs on the MPDCCH to decode based at least on a length of the DCI;
    wherein the length of the DCI on the MPDCCH decoded by the wireless communication device is different from a length of other DCIs of the plurality of DCIs on the MPDCCH decoded by other devices belonging to a device category other than the first device category.

17. The non-transitory memory element of claim 15, wherein, for distributed transmissions, at least some resources are shared between the EPDCCH on common search space and one or more of the following:
    the MPDCCH; or
    the EPDCCH on wireless communication device-specific search space.

18. The non-transitory memory element of claim 17, wherein the at least some resources are shared by overlaying one or more but not all physical resource block pairs.

19. The non-transitory memory element of claim 17, wherein resource elements are transmitted on multiple respective ports, wherein the instructions are executable by the processing element to further cause the wireless communication device to access the at least some resources through multi-user multiple-input-multiple-output (MIMO) methods.

20. The non-transitory memory element of claim 19, wherein sharing of the at least some resources is managed by the cellular base station and is transparent to the wireless communication device.

\* \* \* \* \*